T. Allen.
Making Rivets.
No. 43. Reissued Jul. 8, 1842.
7448X
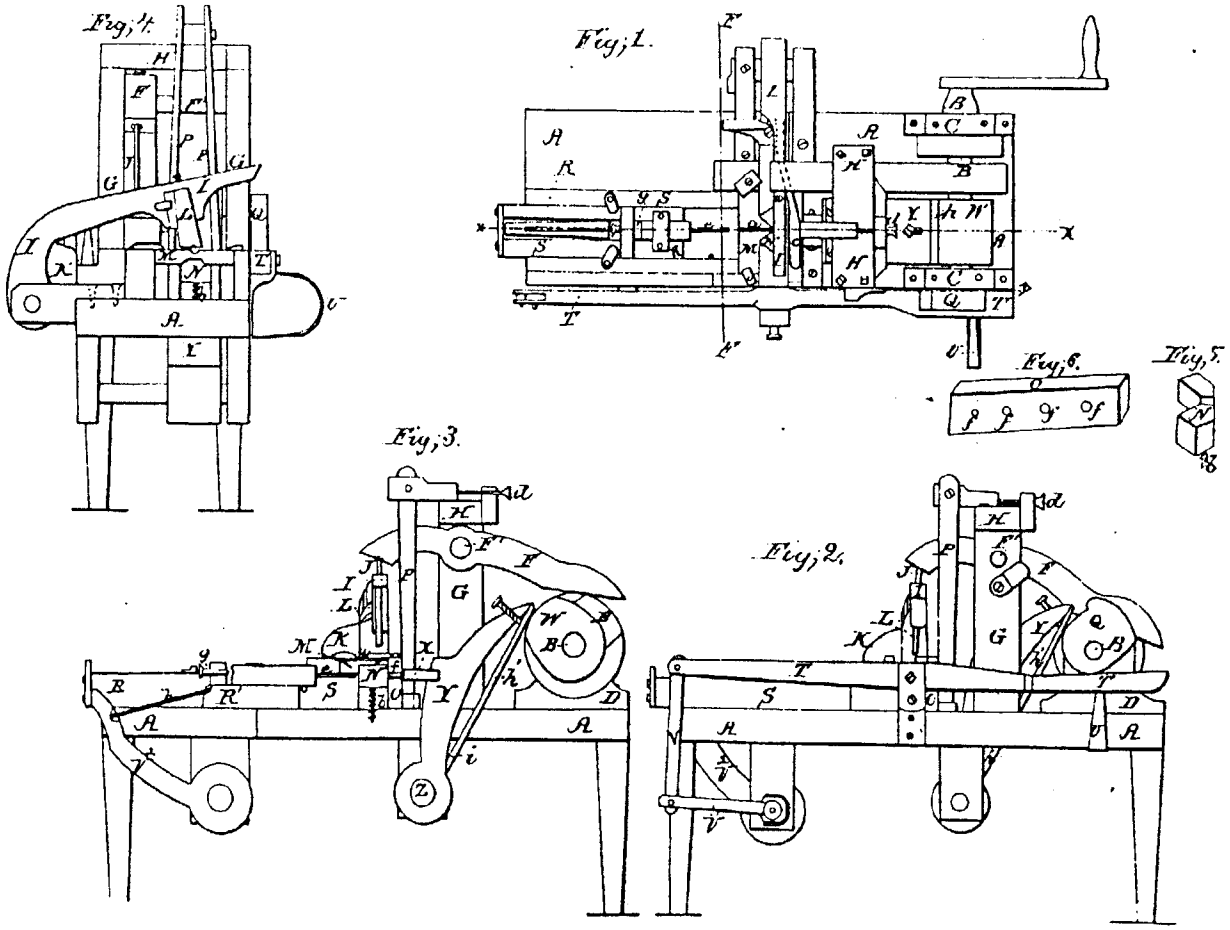
THE GRAPHIC CO. PHOTO-LITH. 39 & 41 PARK PLACE, N.Y.

UNITED STATES PATENT OFFICE.

TIMOTHY ALLEN, OF EEL RIVER, MASSACHUSETTS.

IMPROVEMENT IN MACHINES FOR MAKING COOPERS' AND OTHER RIVETS.

Specification forming part of Letters Patent dated February 28, 1843; Reissue No. 43, dated July 8, 1842.

*To all whom it may concern:*

Be it known that I, TIMOTHY ALLEN, of Eel River, in the county of Plymouth and State of Massachusetts, have invented a new and Improved Machine for Making Rivets for the Use of Coopers and for other Purposes; and I do hereby declare that the following is a full and exact description thereof.

In the accompanying drawings, Figure 1 is a plan or top view of the whole instrument; Fig. 2, a side view; Fig. 3, a vertical section through the line *x x* of Fig. 1, and Fig. 4 is a vertical cross-section in the line & &.

Where like parts are shown in each of these figures, they are designated by the same letters of reference.

A A is the bed of the machine, which, together with the frame, generally may be made of cast-iron.

B is the driving-shaft, to which the power is to be applied by which the machine is to be driven. This shaft runs in boxes or bearings C C on standards D D, which rise to a suitable height from the bed-piece. This shaft carries three cams, one of which operates the cutter by which the wire or rod is to be cut that is to be formed into rivets; another works the follower or apparatus by which the piece that has been cut off is carried forward into a die plate or block to be headed, and by which it is subsequently pushed out from said plate. The third cam works the heading die or punch. The cam E, Fig. 3, is that which operates the cutter.

F is a lever upon which the cam E acts. Said lever is attached to a shaft, F', that has its bearings in the cheek-pieces or uprights G G, which are connected together at top by the cross-piece H H. The cutter-lever I (seen most distinctly in Fig. 4) stands at right angles to the lever F, by which it is to be forced down.

J is a rod or toggle-pin which enters a cavity in both these levers, and serves to convey the action from one of them to the other.

K is a spring which forces the lever I up when it is relieved from the action of the lever F. A movable cutter, L, is affixed to the lever I by screws or wedges, and this in its descent acts against and passes behind a stationary cutter, M, which is shown as held in place by buttons; but any other device may be used that admits of its ready removal.

The wire or rod to be cut is fed in by hand under the movable cutter, there being a guide-groove, *a*, to receive it on the face of the stationary cutter M.

Immediately under the cutter L, in rear of and on the same level with the stationary cutter, there is a sliding or descending block, N, which is borne up by a spiral spring, *b*, pressing upon its lower side. This sliding-block is shown separately on an enlarged scale at Fig. 5. Along this sliding block the groove *a* is continued, and it must on this part be of a length equal to that of the piece that is to be cut off to form a rivet. To regulate this length there is a movable gage or stop, *c*, which may be set to any required distance behind the movable cutter. When the piece has been cut off by the descent of the movable cutter, it will be held between it and the sliding block N, and will be carried down by the continued descent of the cutter until it arrives opposite to an opening in a cast-iron die plate or block, into which it is then to be forced.

O, Fig. 3, is a section of the cast-iron die plate or block, which is shown separately at Fig. 6, where it is represented with holes of different sizes to adapt it to the rod or wire to be headed. This die-plate is to be held firmly in its place, and may be shifted at pleasure. Its thickness should be somewhat greater than the length of the shank of the rivet.

The method which I have adopted of holding it in place is the following: I take two bars, P P, which are connected together at their upper ends, and which drop into mortises or gains on the bed-piece of the frame at their lower ends. These I force forward at their upper ends by means of a set-screw, *d*, working through a nut on the cap-piece H. By means of this screw the die-plate may be shifted and tightened at pleasure.

Q is the cam which works the follower apparatus. This apparatus consists of a sliding box, R R, that rests upon the bed A A of the machine, and is retained between cheek-plates S S, which guide it back and forth. To this sliding box is attached the driving-rod *e e*, which is brought up against the piece that has been cut off from the rod at the moment of its being depressed, so as to stand opposite to the opening *f* in the die-plate O, into which it forces it sufficiently far to enable it to be acted upon by the heading die or punch. The driving-rod *e* may be regulated by a set-screw, *g*, so as to advance the piece to the precise point required. The heading-punch is then brought up against the piece, which projects just far enough beyond the back face of the die-plate for the formation of the head, the driver *e* bearing against its opposite end. The cam Q is so formed as to cause the driving-rod *e* to make a second advance within the opening *f*, and to force the headed rivet out of the die-plate, when it immediately retreats. The forcing forward and retreat of the driving-rod is effected in the following manner:

T is a lever upon which the cam Q operates, and which is forced up by a spring, U, acting against its under side. This lever is connected by the jointed rods V V′ with the forcing-arm $V^1$, from which a rod or toggle-pin, *h*, extends to the block R′, making a part of the sliding box R, and forces said box forward, and when the action of the cam Q ceases the sliding box and driving-rod are forced back by the action of the spring U and of the forcing-arm $V^1$, which bears against the end of the box.

The heading is effected in the following manner: W is the cam which works the heading-punch X, said punch being attached to the heading-lever Y, which has its fulcrum at Z.

In the rear of the lever Y there is an iron plate, *h′*, which may be faced with steel, and against this the cam W operates. This plate is jointed at its lower end, *i*, to the lever Y, and is at its upper end regulated by the set-screw *j*, by which the action of the heading-punch can be regulated with precision.

In order to insure the regular action of the machine, a fly-wheel may be placed on the driving-shaft; but this I have not deemed it necessary to represent in the drawings. I intend sometimes, also, instead of using a solid cast-iron die-plate, as described above, to make the holding-die in two parts, as in some other machines, and to cause one section of it to open and close, so as to grip the rod or wire between the upper and lower portions. As this is no new device, every machinist will be able to make this variation, should he think it desirable. I have, however, found the solid die-plate to answer well in practice, and believe that I was the first to use a die plate or block of this kind. The respective cams must be so formed, proportioned, and arranged as to perform their offices in due succession, and for this it is not necessary to give any instructions.

The form and proportions of the respective parts of this machine may be varied, while it will remain substantially the same in all its essential characteristics. I do not intend, therefore, to limit myself in these particulars; but

What I claim as new in the within-described machine, and desire to secure by Letters Patent, is—

1. The manner of combining and arranging the apparatus for forcing the piece into the die to be headed, and for forcing it out after the heading has been effected, said apparatus consisting of the lever T, the forcing-arm $V^1$, the sliding box R, the rod or toggle-pin *h*, and their appendages, combined and operating as herein set forth.

2. In combination with the other parts of this apparatus, the use of the solid cast-iron die plate or block for containing the piece while it is being headed.

TIMOTHY ALLEN.

Witnesses:
WM. THOMAS,
JOHN BURGESS.